(12) United States Patent
Markel et al.

(10) Patent No.: US 9,798,294 B2
(45) Date of Patent: Oct. 24, 2017

(54) SYSTEM, METHOD AND COMPUTER PROGRAM PRODUCT FOR DETECTING TAMPERING IN A PRODUCT

(71) Applicant: NXP B.V., Eindhoven (NL)

(72) Inventors: Shlomo Markel, Haifa (IL); Jacob Mendel, Kibutz Givat Brenner (IL)

(73) Assignee: NXP B.V., Eindhoven (NL)

( * ) Notice: Subject to any disclaimer, the term of this patent is extended or adjusted under 35 U.S.C. 154(b) by 108 days.

(21) Appl. No.: 13/727,385

(22) Filed: Dec. 26, 2012

(65) Prior Publication Data

US 2014/0077928 A1    Mar. 20, 2014

Related U.S. Application Data

(60) Provisional application No. 61/702,685, filed on Sep. 18, 2012.

(51) Int. Cl.
| | |
|---|---|
| G09F 3/03 | (2006.01) |
| G05B 1/00 | (2006.01) |
| G09F 3/00 | (2006.01) |
| G06F 21/86 | (2013.01) |

(Continued)

(52) U.S. Cl.
CPC ............... *G05B 1/00* (2013.01); *G06F 21/86* (2013.01); *G09F 3/0292* (2013.01); *G09F 3/03* (2013.01); *G09F 3/0329* (2013.01); *G09F 3/0335* (2013.01); *G09F 3/0376* (2013.01); *B65D 2101/00* (2013.01); *G06F 21/64* (2013.01); *G06F 21/87* (2013.01)

(58) Field of Classification Search
CPC ........ B65D 2101/00; B65D 2101/0007; B65D 2101/0023; B65D 2101/0092; G06F 21/64; G06F 21/87; G09F 3/0292; G09F 3/0329; G09F 3/0335; G09F 3/0376
USPC ..................................... 340/539.31
See application file for complete search history.

(56) References Cited

U.S. PATENT DOCUMENTS

| | | | | |
|---|---|---|---|---|
| 6,869,015 | B2 * | 3/2005 | Cummings et al. ..... | 235/462.25 |
| 7,340,602 | B2 * | 3/2008 | Serret-Avila ................. | 713/161 |
| 7,644,290 | B2 * | 1/2010 | Ransom et al. .............. | 713/194 |

(Continued)

FOREIGN PATENT DOCUMENTS

TW     201229768 A1    7/2012

OTHER PUBLICATIONS

European Search Report for related European Patent Application No. 13004404.3, mailed Feb. 10, 2014; 5 pages.

(Continued)

*Primary Examiner* — Benyam Haile

(57) ABSTRACT

A system for detecting tampering in a product having a tamper-detector seal, including a secure element configured to store a digital signature and a data associated with the digital signature, transmit the digital signature and the data associated with the digital signature in response to a request, detect tampering of the tamper-detector seal, and modify the data associated with the digital signature if tampering is detected. The system further includes a seal validation device configured to receive a public key associated with the product, request the digital signature and the data associated with the digital signature from the secure element, and validate the digital signature utilizing the data associated with the digital signature and the public key associated with the product.

15 Claims, 4 Drawing Sheets

(51) Int. Cl.
  G06F 21/64  (2013.01)
  G06F 21/87  (2013.01)

(56) References Cited

U.S. PATENT DOCUMENTS

| | | |
|---|---|---|
| 7,652,575 B2 | 1/2010 | Lyons et al. |
| 7,791,484 B2 * | 9/2010 | Commagnac et al. .... 340/572.1 |
| 7,937,593 B2 * | 5/2011 | Chen et al. ................... 713/189 |
| 8,004,404 B2 * | 8/2011 | Izumi et al. .................. 340/540 |
| 2005/0039040 A1 * | 2/2005 | Ransom ............... G01R 22/066 726/6 |
| 2006/0214789 A1 * | 9/2006 | Posamentier et al. ..... 340/545.6 |
| 2007/0168680 A1 | 7/2007 | Jonas |
| 2008/0149518 A1 * | 6/2008 | Macor ................... B65D 85/58 206/459.5 |
| 2009/0100271 A1 * | 4/2009 | Harris .......................... 713/189 |
| 2010/0117797 A1 * | 5/2010 | Bauchot .............. B65D 55/028 340/10.1 |
| 2011/0199225 A1 * | 8/2011 | Touchberry et al. ......... 340/679 |
| 2012/0093318 A1 | 4/2012 | Obukhov et al. |
| 2013/0169992 A1 | 7/2013 | Panshin et al. |

OTHER PUBLICATIONS

Communication from the Examining Division of the European Patent Office for related European Patent Application No. 13004404.3, mailed Jun. 6, 2014; 5 pages.

Office Action directed to related Taiwanese Patent Application No. 102132419, mailed May 18, 2015; 8 pages.

Office Action directed to related Taiwanese Patent Application No. 102132419, mailed Mar. 2, 2016; 9 pages.

* cited by examiner

SYSTEM, METHOD AND COMPUTER PROGRAM PRODUCT FOR DETECTING TAMPERING IN A PRODUCT

CROSS REFERENCE TO RELATED APPLICATIONS

The present application claims the benefit of U.S. Provisional Application No. 61/702,685, filed Sep. 18, 2012, which is incorporated herein by reference in its entirety.

FIELD

Embodiments of the disclosure relate generally to authentication. More specifically, embodiments of the disclosure relate to a system, method, and computer program product for authenticating a sealed product using a digital signature.

BACKGROUND

To ensure authenticity of a product, a label or mark is typically placed on the product or on a seal of the product. For example, a label or mark may be placed on the box/packaging of the product, a pallet used for delivery of the product, or the bottle/housing containing the product, and such label may be placed such that the label must be broken in order to access the product (for example, a label printed on wrapping around the lid of a bottle is configured to break when the lid is twisted or otherwise lifted to open the bottle). In the alternative, or in addition to a label or mark, a seal may be used, such as a cork, bottle cap, lid, or any other sealing mechanism, to ensure both authenticity and integrity of the product. These techniques may not protect against sophisticated forms of counterfeiting.

For example, a technique commonly used by counterfeiters is to refill an original container (e.g., empty medicine bottle) with counterfeit content (e.g., counterfeit medicine), and sell the counterfeit product as if original. This technique is also commonly used to counterfeit alcoholic beverages. For example, the contents of an expensive bottle of wine may be replaced with a much cheaper wine, the cork replaced, and the bottle resold. Depending on the skill of the counterfeiter, it may be very difficult to recognize that consumed content has been replaced or compromised until the content is closely examined, used, which may be after the point of sale.

Detecting tampering is of special importance in cases where the content itself cannot be marked, such as in products in liquid form (e.g., alcoholic beverages), and even more so where use of a counterfeit content may lead to serious harm, such as in products like medicines and food.

BRIEF DESCRIPTION OF THE DRAWINGS/FIGURES

Exemplary embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE DISCLOSURE

The following Detailed Description refers to accompanying drawings to illustrate various exemplary embodiments. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The various exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although a seal on a product may appeal intact, and may even include the logo of the manufacturer, a consumer may be concerned that the contents contained therein are counterfeit. Methods and systems are described to allow a consumer (or retailer) to authenticate data stored with the product to provide assurance to a consumer that the product is the original product from the manufacturer.

Figure 1:
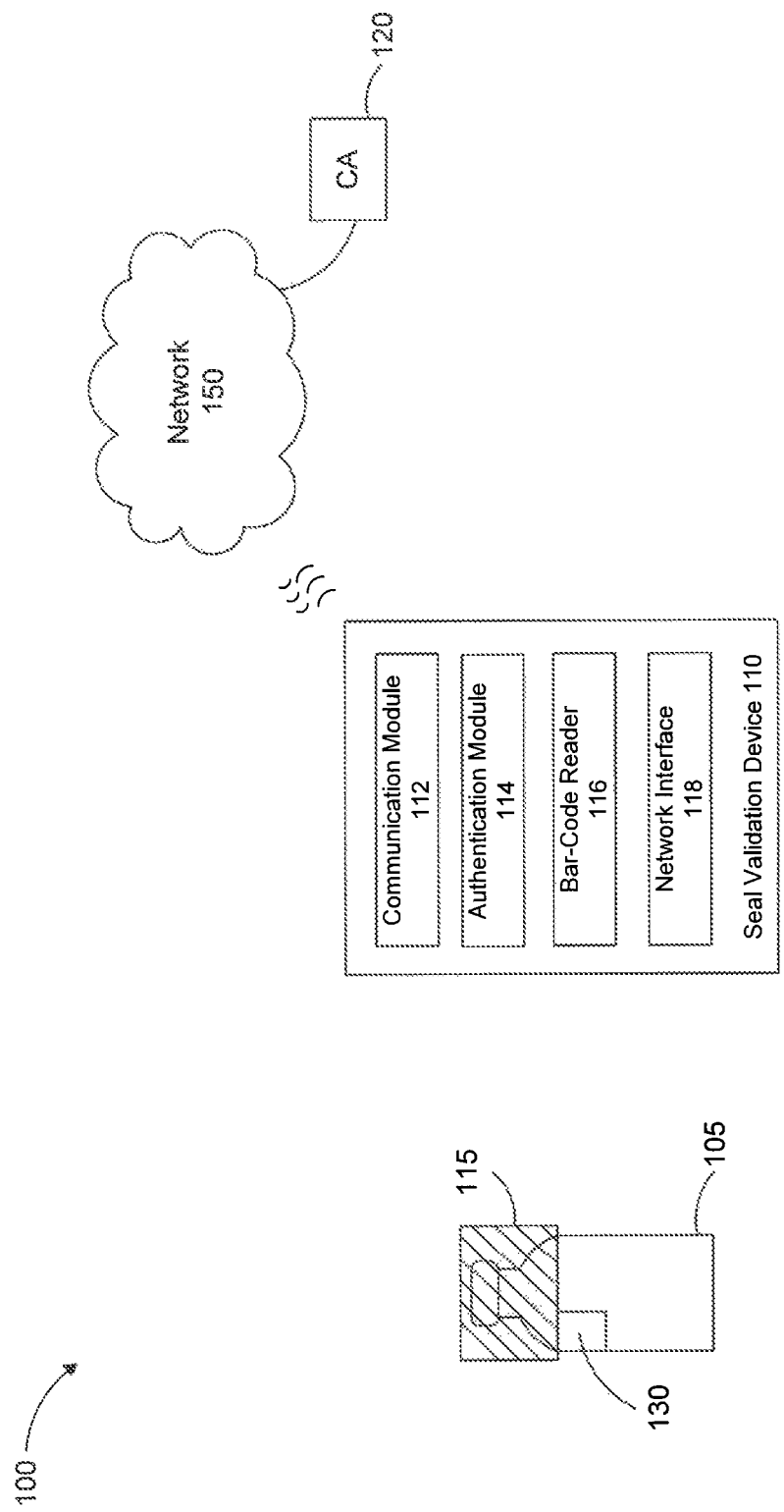
FIG. 1 is a diagram of a system for detecting tampering in a product, according to an exemplary embodiment.

FIG. 1 is a diagram of an exemplary environment 100 for authentication of a sealed product 105, according to embodiments of the present disclosure. Environment 100 may include a pharmacy where a consumer wants to verify if medicine in a sealed bottle is the original, i.e., not a counterfeit version. Alternatively, environment 100 may include a retail store where a consumer wants to verify that contents of a bottle of alcohol are the original contents. As would be appreciated by a person of ordinary skill in the art, environment 100 may include any retail store or location where products subject to counterfeiting are sold.

Environment 100 includes a sealed product 105, an authentication device 110, a communication network 150, a product manufacturer, and a certificate authority 120. Sealed product 105 includes a seal 115 for sealing the contents of sealed product 105. Seal 115 is illustrated as a lid covering the opening of the product, in which case, a lack of a seal, a tear, or puncture therein, may indicate potential tampering. As would be appreciated by a person of ordinary skill in the art, a seal may be any component or components covering the opening of a product. Additionally, or alternatively, seal 115 may be a foil or paper label or the like covering the opening of the product. Sealed product 105 further includes secure element 130 for detecting attempts to tamper with the contents of the packaging.

Figure 2:
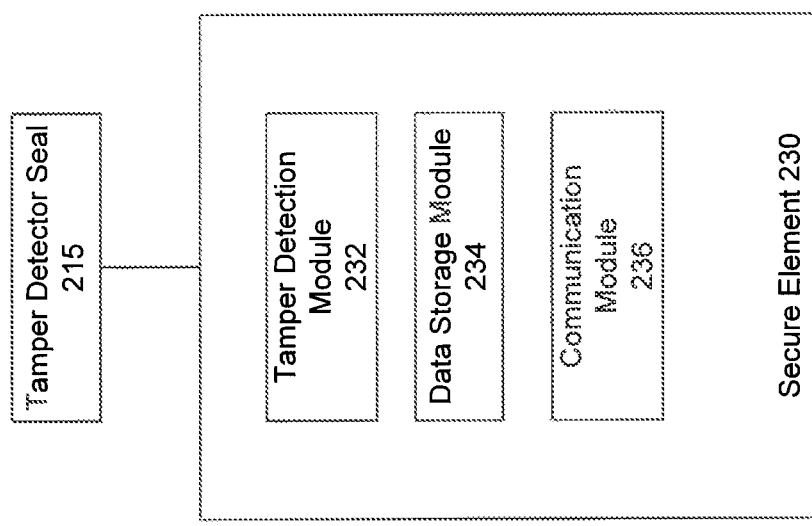
FIG. 2 is a block diagram of a secure element for detecting tampering in a product, according to an exemplary embodiment.

FIG. 2 is a block diagram of an exemplary secure element 230, according to embodiments of the present disclosure. Secure element 230 may be coupled to seal 215 in a manner to detect attempts to break or remove the original seal from the product. For example, an electrically conductive wire may be integrated into seal 215 and connected at both ends to secure element 230. Secure element 230 may be configured to detect an open circuit indicative of a cut to the wire (such as would occur when the original seal is broken or removed from the product). In a further example, secure element 230 may be coupled to a sensor within a pressurized portion of the product container. Secure element 230 is further configured to detect a change in pressure based on data measured by the sensor, indicative of the container being opened. As would be appreciated by a person of skill in the art, other techniques to detect tampering may be used in embodiments of the present disclosure.

In the exemplary embodiment, secure element 230 includes tamper detection module 232, data storage module 234, and communication module 236. Data storage module 234 is configured to store a digital signature for the product. A digital signature is created by hashing a set of data and encrypting the hashed data using a cryptographic key, such as a private key. Data storage module 234 may also store the data used to generate the digital signature. In an embodiment, the set of data used to generate the digital signature for the product may include all or a portion of the serial number or other identifier of the product, a one-time password or timestamp, the location of the manufacturer or packager, etc. The digital signature may be generated during manufacture or packaging of the product and stored in secure element 230.

Tamper detection module 232 is coupled to a tamper detection mechanism integrated into the seal (e.g., a wire) or into the product container (e.g., a sensor). Tamper detection module 232 may include circuits and/or processing elements to detect tampering or an attempt to tamper with seal 215. Additionally, tamper detection module 232 is configured to alter the digital signature or the data used to generate the digital signature when an attempt to tamper with the seal is detected. For example, the digital signature is a string of bits. Tamper detection module 232 may alter one or more of the digital signature bits (e.g., change the values) when an attempt to tamper with the seal is detected. When the data used to generate the signature is also stored, tamper detection module 232 may additionally or alternatively modify one or more of the data values stored in data storage 234.

In an exemplary embodiment, communication module 236 includes circuits and/or processing elements to communicate with an authentication device, such as authentication device 110 illustrated in FIG. 1. For example, secure elements and authentication device may communicate via an RFID protocol. As would be appreciated by a person of ordinary skill in the art, any wired or wireless communication protocol can be used. Communication module 236 may be further configured to receive a request from an authentication device, such as authentication device 110 illustrated in FIG. 1, for authentication data and to respond to the request by transmitting the requested authentication data.

Returning to FIG. 1, secure element 130 communicates with an external authentication device 110. Authentication device 110 may be a standalone device or may be hardware and/or software included in a device, such as a wireless phone, a personal computer, a tablet computer, a PDA, or an application-specific device. Authentication device 110 includes a communication module 112 and an authentication module 114. Communication module 112 is configured to communicate with a corresponding communication module of a secure element (such as communication module 236 illustrated in FIG. 2). Communication module 112 may communicate using an RFID protocol and/or any wired or wireless communication protocol. Communication module 112 includes circuits and/or processing elements to request data from secure element 130 and to receive data from the secure element 130.

Authentication module 114 is configured to authenticate the digital signature received from secure element 130. When authentication is initiated, authentication module 114 is configured to obtain the data necessary to authenticate the digital signature. Authentication module 114 may request the digital signature and the set of data used to generate the digital signature from a secure element coupled to the product. Alternatively, authentication module 114 may request the digital signature from a secure element and obtain the set of data used to generate the digital signature through alternative methods. For example, some or all of the data may be obtained from the product bar code or may be entered into the authentication device in a conventional manner, such as by use of a keyboard or a keypad. Authentication device 110 may therefore include an interface to an external bar code reader or may include a bar code reader 116. Bar code reader 116 (when present) includes circuits and/or processing elements to read bat code identification information from the product being validated. The authentication device receives the bar code data and parses the received data to extract the data necessary to authenticate the digital signature.

Authentication module 114 is further configured to obtain a cryptographic key (e.g., the public key) for the product. The cryptographic key may be stored in the authentication device or may be obtained in real-time. For example, device 110 may obtain the cryptographic key from a certificate authority over a network. Seal authentication device 110 may therefore include network interface 118 to couple the authentication device to a communication network such as the internet. The authentication device 110 may use portions of the product identification information (e.g., as obtained from a bar code) to identify the certificate authority holding the keys from the product.

Figure 3:
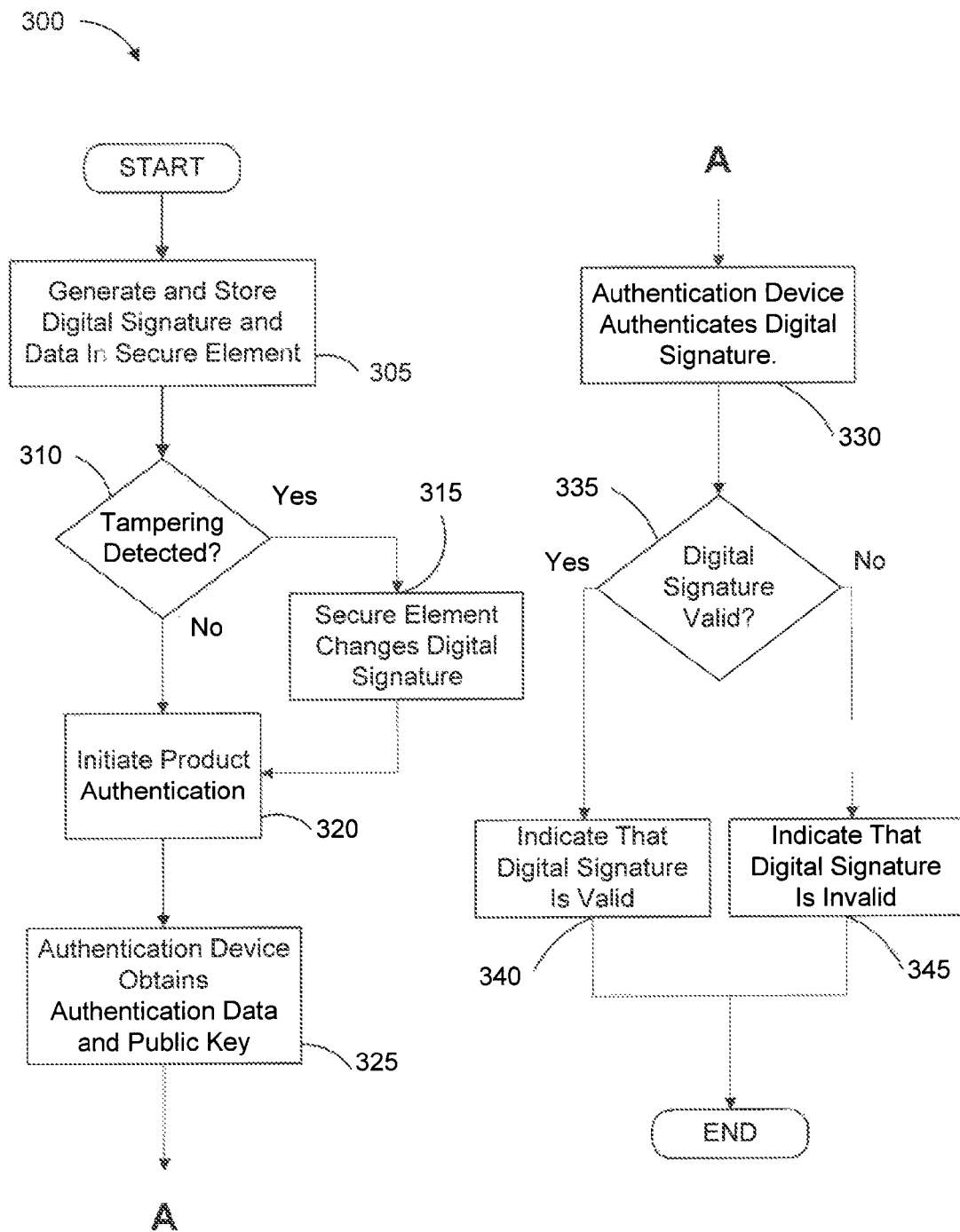
FIG. 3 is a flow diagram of a method for detecting tampering in a product, according to an exemplary embodiment.

FIG. 3 is a flow diagram of a method 300 for determining the authenticity of a product, according to embodiments of the present disclosure. The flowchart is described with continued reference to the embodiments of FIG. 1 and FIG. 2. However, flowchart 300 is not limited to those embodiments.

At block 305, a digital signature for a product is generated using a set of data. The digital signature may be generated by the manufacturer of the product, the packager of the product, or by another entity in the distribution chain. In this step, the digital signature and/or the set of data used to generate the digital signature is stored in data storage module 234 of the secure element. As described above, the digital signature is generated by hashing data set of data using a hash algorithm (e.g., SHA) and encrypting the hashed data with a cryptographic key assigned to the entity generating the digital signature. The cryptographic key may be a portion of an asymmetric key pair (e.g., a private key). The corresponding portion of the asymmetric key pair (e.g., the public key) may be stored in a certificate authority or other publicly accessible database. The public key can be downloaded and used by an authentication device to authenticate the digital signature.

At block 310, secure element 130 detects an attempt to tamper with the seal of the product. If an attempt to tamper is detected, operation proceeds to block 315. If no tampering is detected, operation remains at step 310.

In block 315, modifications to the digital signature and/or data used to generate the digital signature stored in the secure element are made. For example, the secure element may modify the value of one or more bits in the digital signature and/or one or more bits in the data used to generate the digital signature. Modification of either the digital signature or the associated data will cause authentication of the digital signature using the associated data to fail, and thus, indicate that seal 115 has been tampered with.

At block 320, product authentication is initiated. For example, a user may launch an application on the authentication device (or device containing the authentication device) to initiate the authentication process.

At block 325, the authentication device obtains the information necessary to perform authentication of the product. In this step, the authentication device requests a digital signature for the product from the secure element. The authentication device also obtains the set of data used to generate the digital signature. This data may also be requested from the secure element, obtained by reading a bar code associated with the product, and/or entered by the user of the authentication device. Authentication device 110 also obtains the cryptographic key (e.g., public key) needed to authenticate the digital signature. The cryptographic key may be stored in the authentication device or obtained from an external source such as a certificate authority.

At block 330, authentication device 110 authenticates the received digital signature. Specifically, authentication device 110 hashes the set of data used to generate the digital signature using the same hash function as was used to create the received digital signature. The resulting hash value is referred to herein as the validation hash. The authentication device also decrypts the digital signature using the key corresponding to the key used to generate the digital signature (e.g., the public key). The result is a decrypted hash value. The authentication device then compares the decrypted hash value to the validation hash value. If the decrypted hash value matches the validation hash value, operation proceeds to step 340 where the authentication device 110 indicates to the user that the digital signature is authentic and thus the product has not been compromised. If, on the other hand, decrypted hash value does not match the validation hash value, operation proceeds to step 345 where the authentication device 110 indicates that the digital signature is not authentic, and thus, the product may have been compromised. The indication to the user may be a visual indication and/or may be an audible indication.

Figure 4:
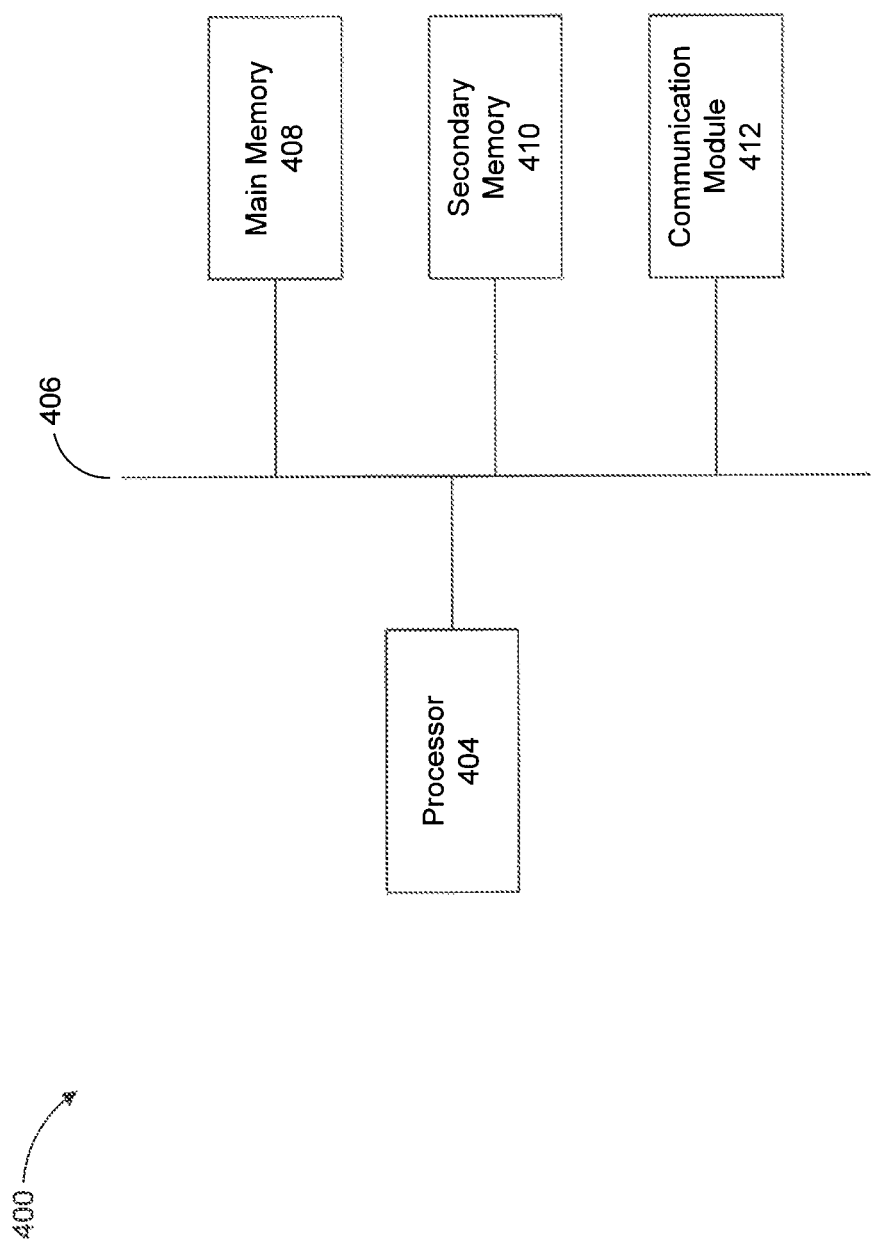
FIG. 4 depicts an exemplary processing system in which exemplary embodiments of the present disclosure may be implemented.

Various aspects of the present disclosure can be implemented by software, firmware, hardware, or a combination thereof. FIG. 4 illustrates an exemplary processing system 400 in which exemplary embodiments of the present disclosure, or portions thereof, can be implemented as processor-executable code. For example, the methods illustrated by flowchart 300 of FIG. 3, can be implemented in processing system 400. Various embodiments of the disclosure are described in terms of this example processing system 400. After reading this description, it will become apparent to a person of ordinary skill in the art how to implement the disclosure using other processing systems and/or architectures.

Processing system 400 includes one or more processors, such as processor 404. Processor 404 can be a special purpose or a general purpose processor. Processor 404 may be connected to a communication infrastructure 406 (for example, a bus or network) for communicating with other modules, such as communication module 412, which may provide radio frequency identification communication to sealed product 105 illustrated in FIG. 1. Processing system 400 also includes a main memory 408, such as a random access memory (RAM), and may also include a secondary memory 410, such as an EEPROM, which may be used for storing processor-executable code and other data, such as a digital signature, in a semi-permanent manner. Processor 404 reads from and/or writes to these memory units in a well-known manner.

Such processor-executable code, when executed, enable processing system 400 to implement exemplary embodiments of the present disclosure as discussed herein. In particular, the processor-executable programs, when executed, enable processor 404 to implement the processes of the present disclosure, such as the steps in the methods illustrated by flowchart 300 of FIG. 3, but also, functionality directed to a secure element, as discussed with respect to FIG. 1 and FIG. 2.

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed:

1. A device for detecting tampering with a product having a seal, comprising:
    a data storage module that stores a digital signature associated with the product and stores a set of data used to generate the digital signature, and wherein the set of data includes identification data for the product;
    a sensor configured to sense a change in air pressure inside a product container, wherein a change in air pressure inside the product container indicates that the product container is being opened; and
    a tamper detection module, coupled to the data storage module and the sensor, configured to detect tampering with the product container in response to the change in air pressure and to modify the digital signature when the tampering is detected.

2. The device of claim 1, wherein the tamper-detection module is further configured to modify the set of data used to generate the digital signature when tampering is detected.

3. The device of claim 1, wherein the set of data used to generate the digital signature includes a one-time password.

4. The device of claim 1, further comprising a communications module configured to communicate with an external authentication device.

5. The device of claim 1, wherein the digital signature includes a set of bits and wherein the tamper detection module is configured to modify the value of a bit in the digital signature when tampering is detected.

6. The device of claim 1, wherein the set of data used to generate the digital signature includes a set of bits and wherein the tamper detection module is configured to modify the value of a bit in the set of data when tampering is detected.

7. A system for detecting tampering with a product having a seal and a secure element, the system comprising:
a public cryptographic key associated with the product;
a communications module configured to wirelessly communicate with the secure element and retrieve, from the secure element, a digital signature that identifies the product, the digital signature generated from a set of data, the set of data including identification data from the product;
a data storage module that stores the digital signature and the set of data;
a sensor configured to sense a change in air pressure inside a product container, wherein a change in air pressure inside the product container indicates that the product container is being opened;
a tamper detection module, coupled to the data storage module and the sensor, configured to detect tampering with the product container in response to the change in air pressure and to modify the digital signature when the tampering is detected; and
a processor coupled to the data storage module, configured to:
obtain the set of data used to generate the digital signature; and
authenticate the digital signature using the public cryptographic key associated with the product and the set of data used to generate the digital signature.

8. The system of claim 7, wherein the communications module is further configured to obtain the public key associated with the product from an external database.

9. The system of claim 7, wherein the processor is configured to authenticate the digital signature by:
decrypting the digital signature using the public key to generate a decrypted hash value;
hashing the set of data to generate a validation hash value; and
comparing the decrypted hash value to the validation hash value.

10. The system of claim 7, wherein the processor is further configured to provide an indication to a user of the device whether authentication of the product was successful.

11. A method, in an authentication device, for validating the authenticity of a product having a seal and a secure element comprising:
receiving a digital signature associated with the product from the secure element;
obtaining a set of data used to generate the digital signature;
storing the set of data and the digital signature in a data storage module, the set of data including identification data from the product;
sensing for a change in air pressure inside a product container, where in the change in air pressure indicates that the product container is being opened;
detecting if the product container is opened, and in response, modifying the digital signature;
decrypting, by a processor in the authentication device, the received digital signature using a public cryptographic key to generate a decrypted hash value;
hashing, by the processor in the authentication device, the set of data to generate a validation hash;
comparing the decrypted hash value to the validation hash value; and
indicating that authentication was successful and the product container has not been opened, when the decrypted hash value matches the validation hash.

12. The method of claim 11, wherein obtaining the set of data comprises:
obtaining the set of data from the secure element.

13. The method of claim 11, wherein obtaining the set of data comprises:
obtaining the set of data from a bar code coupled to the product.

14. The method of claim 11, wherein the received digital signature is encrypted using a private key associated with the product.

15. The method of claim 11, further comprising:
retrieving the public cryptographic key from an external database.

* * * * *